June 12, 1962 H. L. DIMKE 3,038,764
OIL THROWER ARRANGEMENT FOR DYNAMOELECTRIC MACHINES
Filed Dec. 1, 1959
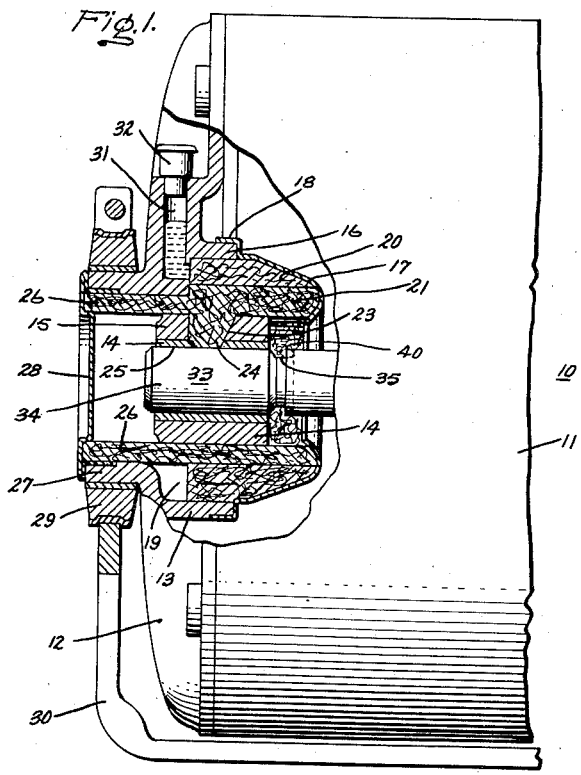
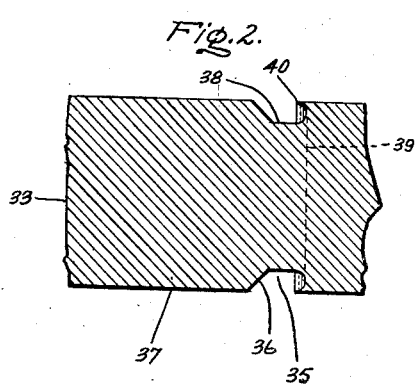
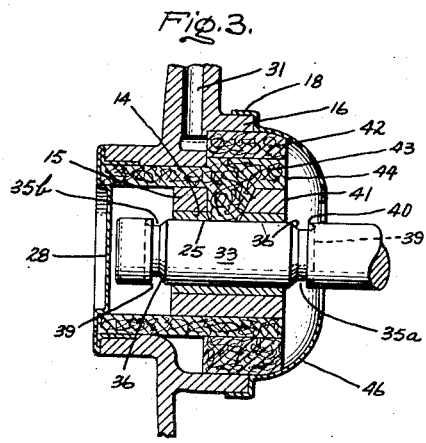
Inventor:
Harold L. Dimke,
by John M. Stoudt
Attorney.

United States Patent Office 3,038,764
Patented June 12, 1962

3,038,764
OIL THROWER ARRANGEMENT FOR DYNAMO-ELECTRIC MACHINES
Harold L. Dimke, Fort Wayne, Ind., assignor to General Electric Company, a corporation of New York
Filed Dec. 1, 1959, Ser. No. 856,564
1 Claim. (Cl. 308—36.4)

My invention relates to a dynamoelectric machine and, more particularly, to such a machine incorporating an improved liquid lubricant thrower arrangement.

It is common practice in dynamoelectric machines, particularly in the smaller sizes, to employ sleeve type bearings having journalling surfaces for rotatably supporting a rotor shaft and to lubricate such surfaces with a liquid lubricant.

Adequate lubrication is particularly important in fractional horsepower motors, which are often placed in inaccessible locations and are required to operate for long periods of time without supervision. Therefore, in motors of the smaller type lubricant is generally retained in a suitable lubricant reservoir, usually consisting of a fibrous packing material, with means to feed the liquid lubricant from the reservoir onto the journalling surfaces. The lubricant is then moved axially along the bearing surfaces by grooves in the rotor shaft or other means until it escapes at the ends of the bearing.

In order to prevent the lubricant from being transmitted to the interior parts of the dynamoelectric machines where it can come into contact with electrical components, such as windings or the like, thereby deteriorating and breaking down the insulation of such electrical components, ultimately causing premature motor failure, and for purposes of lubricant conservation, it is common practice to provide a so-called oil slinger or liquid lubricant thrower to return this escaping oil to the liquid lubricant reservoir for reuse. This thrower usually consists of a radially outwardly extending flange member from which the liquid lubricant is thrown back into the liquid lubricant reservoir by centrifugal force. It has often been the practice to provide such thrower as a separate component of the rotor assembly in dynamoelectric machines, securing the thrower directly on the rotor shaft. However, in an effort to reduce the overall weight and cost of the rotor shaft, the oil thrower is frequently made of a different material from the shaft. Consequently, the thrower and shaft have different coefficients of expansion causing the thrower to expand at a different rate from the shaft during motor operation, which in turn, results in a radial space therebetween and permits the oil to pass through this space into the interior of the motor.

Heretofore, in the interests of saving materials, labor, weight of construction, and overcoming the disadvantages which may accompany the use of an individual thrower member, various attempts have been made to simplify the thrower construction by incorporating the lubricant thrower into the structure of other existing rotor components, but the results have not been satisfactory for one reason or another. For example, one arrangement designed to obviate the need for a separate oil thrower, is the one in which a circumferential groove is cut into the rotor shaft. The shaft construction as disclosed in the Janca Patent No. 1,710,928 is typical of this approach. Briefly described, in an attempt to stop oil creepage and to sling the oil outwardly, the groove generally has one side face formed with a shoulder perpendicular to the axis of shaft rotation. It has been found, however, that although highly desirable from the standpoints of low cost and weight, the groove construction was unsatisfactory and deficient in several respects. At relatively low shaft revolutions, such as encountered during the starting and stopping of the motor, the oil moved axially along the shaft over the shoulder. Even the addition of several adjacent grooves did not satisfactorily solve this "oil creepage" problem. Further, this type of construction resulted in the slinging of the oil, at higher speeds, outwardly in substantially a radial direction away from the shaft, and not axially toward the lubricant reservoir. Thus, it was necessary to completely surround the groove with lubricant absorbent material to return the oil axially back to the reservoir.

It is therefore readily apparent that the provision of an inexpensive yet satisfactory and efficient oil throwing arrangement for dynamoelectric machines, particularly of the fractional horsepower type, is a continuing problem in the motor industry.

Accordingly, it is a primary object of the present invention to provide an improved low cost oil thrower arrangement which is simple and novel in construction yet effectively eliminates oil creepage along the shaft and returns the oil to a lubricant reservoir for reuse.

It is another object of the present invention to provide an improved oil thrower construction, which can be provided integrally on the rotor shaft at a minimum of manufacturing costs.

It is a further object of this invention to provide an improved oil thrower arrangement which saves space, cost in material and labor, and weight, and has improved performance characteristics.

In carrying out the objects of this invention in one form thereof, I provide an improved oil slinger arrangement in which I furnish a rotor shaft for use in a dynamoelectric machine with a circumferential groove of novel construction. The groove has one side wall formed with a curved or undercut portion to define a pocket therein for effectively stopping the creepage of lubricant along the shaft at low shaft speeds of revolution and for throwing lubricant radially and axially away from the shaft at high speeds of rotation.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawing:

FIG. 1 is a fragmentary side view, partially cut away and partially in cross section, of a dynamoelectric machine incorporating the preferred embodiment of the improved oil slinger arrangement of the present invention;

FIG. 2 is a cross section view of a portion of the shaft, which contains the novel oil slinger construction, to illustrate detail; and FIG. 3 is an axial view, partially in cross section of a bearing and reservoir assembly rotatably supporting a shaft having the preferred oil slinger construction provided adjacent each end of the bearing.

Referring now to FIG. 1 of the drawing, there is shown one end of a small dynamoelectric machine, designated as a whole by numeral 10, having a frame 11 which encloses the usual stator and rotor (not illustrated) formed in the standard manner well known in the art. Frame 11 includes the usual end shield construction at each end. For simplicity of illustration, only one end shield, indicated at 12, has been shown, but it is understood that the end shield at the other end of motor 10 may be similar in structure.

In the illustrated construction, end shield 12, preferably a metal casting, is conventionally formed with an integral substantially cylindrical bearing housing, generally indicated at 13, for retaining a sleeve type bearing 14. The bearing is press-fitted into an axially extending bearing support 15, integrally connected to the end shield, as by spider means or the like (not shown). Radially spaced from support 15 is an extension portion 16 which projects axially inward toward the interior of the motor. A cup-shaped sheet metal member 17 terminates at its outer perimeter in a flange 18 adapted to fit over and engage housing extension 16 so that, in effect, housing 13 and member 17 together form a lubricant reservoir cavity 19. This cavity is filled with a mass of lubricant impregnated absorbent packing material 20 and a felt ring 21, which has a wick portion 22 for lubricant feeding purposes positioned in transverse openings 23 and 24 respectively disposed in bearing support 15 and bearing 14, affording communication between the lubricant reservoir and the journalling surface 25 of the bearing. Felt ring 21 is additionally shown as having integral finger portions 26 projecting axially away from the interior of the motor, beyond the end of the bearing support 15. A hub extension 27 of the bearing housing 13 surrounds finger portions 26 and is closed at its outer end by a cup 28.

A resilient motor mounting annulus 29 is arranged around hub 27 and may be clamped to any conventional base 30 for supporting motor 10. The bearing housing 13 may also be conveniently provided with an opening 31 through which lubricant may be introduced from time to time into the reservoir as needed and which is closed by a standard pressed-in oil cup 32.

The construction described thus far is by way of illustration and it will be apparent that the present invention is applicable to other types of structural arrangements.

Now, in accordance with the preferred embodiment of this invention, a shaft 33, having its end 34 rotatably supported by bearing surface 25 and carrying the motor rotor, is furnished with a uniquely shaped circumferential groove 35, which is capable of effectively preventing lubricant creepage along the shaft even at relatively slow revolutions of the shaft; e.g. below 500 r.p.m. for a 0.625 inch diameter shaft, and for providing an improved oil throwing action. The groove, more clearly seen in FIG. 2, may be conveniently cut into the shaft 33 at the desired location (to be described hereinafter) by any well known milling operation or the like. Preferably, groove 35 comprises a side wall 36, inclined or beveled from the peripheral shaft surface 37 inwardly toward the groove bottom 38 and a smooth curved side wall 39, defining a pocket therein. More specifically, side wall 39 is undercut or curved back over a part of the groove bottom 38, terminating in a sharp circumferential edge 40, shown as being coextensive with the peripheral surface 37 of the shaft.

When the shaft is properly positioned in motor 10, with shaft end 34 supported by bearing 23 as seen in FIG. 1, groove 35 will be disposed adjacent bearing end 41, between the bearing and cup member 17 with a portion of felt ring 21 radially spaced from and surrounding the groove. During motor operation, as the shaft starts to rotate slowly and gradually picks up speed, lubricant escaping from bearing end 41 will creep along the shaft toward the interior of the motor and pass down inclined side wall 36 into groove 35. At lower speeds, curved wall 39 having, in effect an overhanging portion, prevents the oil from passing beyond the groove into the interior parts of the motor. As the shaft speed increases, the curved wall acts like an oil thrower, centrifugally slinging the lubricant radially and axially outward from the shaft substantially toward the lubricant reservoir. Felt ring 21 absorbs the lubricant and returns it to the reservoir for reuse. Thus, a substantially closed circulatory system for lubricant is provided and the circulation will continue for as long as shaft 33 rotates.

Under certain circumstances; e.g., bi-directional motors where the rotor shaft rotates in either direction and lubricant may escape from the end of the bearing away from the rotor, it may be desirable to dispose a groove having the novel construction of the present invention near each end of the bearing 14, the grooves being identified as 35a and 35b respectively in FIG. 3. For ease of representation, like reference characters designate identical parts heretofore described in connection with FIGS. 1 and 2.

Referring now specifically to FIG. 3, it will be observed that the same conventional cast end shield 12, having the integral bearing housing 13 and sleeve bearing 14, is employed. FIG. 3 illustrates one of the features of the present invention. Taking, for example, groove 35a disposed adjacent bearing end 41 with the slope of curved wall 39 being properly directed back toward the lubricant reservoir, lubricant absorbent material 20 and felt ring 21 of FIG. 1 may be shortened to provide absorbent material 42 and felt ring 43 having an uncovered end surface 44 radially aligned with bearing end 41. The cup-shaped member 46, which surrounds the groove, may therefore be axially shortened, permitting a decrease in overall motor length. During motor operation, rotating groove 35a will centrifugally throw the escaping lubricant into contact with the felt ring end 44 and absorbent material 42, so that the lubricant is caught and returned to the lubricant reservoir. In a similar manner, groove 35b returns the escaping lubricant to the reservoir when oil escapes along the shaft, axially away from the motor interior.

It should be recognized by those skilled in the art that, among other things, the speed of rotation of shaft 33 as well as the proximity of groove 35 to the adjacent bearing end are factors which will determine the most advantageous slope and configuration of curved side wall 39 to throw in the most efficient manner the escaping lubricant back to the lubricant reservoir. In addition, it will be appreciated that an important aspect of the present invention is the groove construction in which at least one side wall is undercut with a sloping or curved surface.

The advantages of the present invention are readily manifest from the foregoing disclosure. With the use of my arrangement having a single circumferential groove economically provided on the rotor shaft, a separate oil slinger member may be completely eliminated while its axial and radial slinging action is satisfactorily performed by the structure of the existing rotor components. Moreover, my improved oil thrower arrangement, which saves labor and material costs, weight of construction and space, in addition, effectively stops oil creepage along the shaft at slow rotor speeds and is capable of efficiently returning the escaping oil from the bearing back to a lubricant reservoir for reuse.

It should be apparent to those skilled in the art, while I have shown and described what at present is considered to be the preferred embodiment of my invention in accordance with the patent statutes, changes may be made in the structure disclosed without actually departing from the true spirit and scope of this invention, and I therefore intend to cover in the following claim all such equivalent variations as fall within the invention.

What I claim as new and desire to secure by Letters Patent of the United States is:

In a dynamoelectric machine, a bearing having an internal journalling surface, a housing having means for supporting said bearing and having means defining a lubricant cavity, lubricant absorbent material disposed in said cavity and surrounding said bearing for retaining lubricant and for supplying lubricant to said journalling surface for the lubrication thereof, a shaft rotatably supported in said journalling surface, said lubricant material extending up to but not substantially axially beyond the end of the bearing disposed toward the interior of the dynamoelectric machine, and means integrally formed on said shaft adjacent each end of said bearing for stopping the creepage of lubricant along said shaft away from said bearing during the rotation of said shaft and for returning the lubricant to said reservoir, said means comprising one circumferential groove extending around the periphery of said shaft, and a cup-shaped member having a shaft receiving opening therein mounted to said housing on the interior side of said machine and surrounding the adjacent groove, with the member projecting up to but not substantially beyond the groove, said grooves each having a side wall disposed adjacent said bearing formed with a surface inclined away from said bearing and having a side wall disposed away from said bearing formed with a curved surface projecting toward said lubricant reservoir and terminating in a sharp peripheral edge to define a pocket therein for preventing lubricant creepage away from said bearing at low speeds of shaft rotation and for performing a slinger action radially and axially outward from said shaft at higher speeds to return lubricant escaping from the ends of said bearing to said lubricant reservoir for reuse.

References Cited in the file of this patent

UNITED STATES PATENTS

| | | |
|---|---|---|
| 2,133,230 | Sanders | Oct. 11, 1938 |
| 2,160,778 | Dall et al. | May 30, 1939 |
| 2,597,694 | Worth | May 20, 1952 |
| 2,845,552 | Robinson | July 29, 1958 |
| 2,850,335 | Thompson et al. | Sept. 2, 1958 |